(12) United States Patent
Kim

(10) Patent No.: US 8,553,517 B2
(45) Date of Patent: Oct. 8, 2013

(54) MAGNETIC MEDIUM USING SPIN-POLARIZED ELECTRONS AND APPARATUS AND METHOD OF RECORDING DATA ON THE MAGNETIC MEDIUM

(75) Inventor: Sung-dong Kim, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 2360 days.

(21) Appl. No.: 10/682,896

(22) Filed: Oct. 14, 2003

(65) Prior Publication Data

US 2004/0165482 A1      Aug. 26, 2004

(30) Foreign Application Priority Data

Oct. 14, 2002  (KR) ................. 10-2002-0062481
Aug. 14, 2003  (KR) ................. 10-2003-0056423

(51) Int. Cl.
*G11B 9/00*     (2006.01)

(52) U.S. Cl.
USPC ................................... 369/126; 369/13.01

(58) Field of Classification Search
USPC ........... 369/13.01, 13.29, 13.3, 13.31, 13.42, 369/13.49, 13.5, 101, 13.02, 13.06, 13.41, 369/126, 120, 13.33, 13.13; 428/820.1, 428/820.2, 820.3; 365/151
See application file for complete search history.

(56) References Cited

U.S. PATENT DOCUMENTS

| | | | | |
|---|---|---|---|---|
| 4,985,627 A | * | 1/1991 | Gutierrez et al. | 250/306 |
| 5,162,819 A | | 11/1992 | Sakai et al. | |
| 5,289,455 A | * | 2/1994 | Kuroda et al. | 369/126 |
| 5,446,687 A | * | 8/1995 | Hurt et al. | 365/121 |
| 5,546,337 A | * | 8/1996 | Hurt et al. | 365/121 |
| 5,604,706 A | * | 2/1997 | Hurt et al. | 365/217 |
| 5,675,532 A | * | 10/1997 | Gemma et al. | 365/151 |
| 5,838,020 A | * | 11/1998 | Hurt | 257/10 |
| 5,874,749 A | | 2/1999 | Jonker | |
| 5,940,314 A | * | 8/1999 | Suzuki et al. | 365/10 |
| 6,018,511 A | * | 1/2000 | Nishikiori et al. | 369/13.49 |

(Continued)

FOREIGN PATENT DOCUMENTS

| | | |
|---|---|---|
| CN | 1243999 | 2/2000 |
| DE | 100 29 593 | 1/2001 |

(Continued)

OTHER PUBLICATIONS

Computer Translation of JP, 11-108610, pub date Apr. 1999.*

(Continued)

*Primary Examiner* — Tan X Dinh
(74) *Attorney, Agent, or Firm* — Harness, Dickey & Pierce, P.L.C.

(57) ABSTRACT

A magnetic medium using spin-polarized electrons, and an apparatus and method of recording data on the magnetic medium are provided. The magnetic medium includes a polarization layer and a magnetic recording layer. The polarization layer spin-polarizes electrons. In the magnetic recording layer, the direction of magnetization varies depending on the direction of the spin-polarization of the electrons. The data recording apparatus includes a light source and a probe. The light source radiates circularly polarized light, and the probe injects electrons spin-polarized by the circularly polarized light into a magnetic medium and changes the direction of the magnetization of the magnetic medium to record data on the magnetic medium. Because the direction of magnetization is adjusted using spin-polarized electrons, fast data recording can be achieved.

35 Claims, 5 Drawing Sheets

(56) References Cited

U.S. PATENT DOCUMENTS

| | | | |
|---|---|---|---|
| 6,061,265 A * | 5/2000 | Hannah | 365/121 |
| 6,101,164 A * | 8/2000 | Kado et al. | 369/126 |
| 6,233,206 B1 * | 5/2001 | Hamann et al. | 369/13.01 |
| 6,304,481 B1 * | 10/2001 | Hurt | 365/118 |
| 6,665,258 B1 * | 12/2003 | Dietzel et al. | 369/126 |
| 6,830,824 B2 * | 12/2004 | Kikitsu et al. | 428/828.1 |
| 6,881,495 B2 * | 4/2005 | Kikitsu et al. | 428/827 |
| 6,906,368 B2 * | 6/2005 | Ito et al. | 257/295 |
| 6,912,148 B2 * | 6/2005 | Hannah et al. | 365/120 |
| 6,982,845 B2 * | 1/2006 | Kai et al. | 360/59 |
| 7,027,364 B2 * | 4/2006 | Hong et al. | 369/13.01 |
| 7,149,180 B2 * | 12/2006 | Onoe et al. | 369/276 |
| 7,170,843 B2 * | 1/2007 | Hong et al. | 369/101 |
| 7,577,078 B2 * | 8/2009 | Kim | 369/126 |
| 2002/0105827 A1 * | 8/2002 | Redon et al. | 365/173 |
| 2003/0053238 A1 * | 3/2003 | Kai et al. | 360/59 |
| 2003/0107833 A1 * | 6/2003 | Rettner et al. | 360/48 |
| 2003/0157325 A1 * | 8/2003 | Anders et al. | 426/402 |
| 2003/0214742 A1 * | 11/2003 | Kai et al. | 360/46 |
| 2004/0165482 A1 * | 8/2004 | Kim | 369/13.01 |
| 2005/0128886 A1 * | 6/2005 | Ogawa et al. | 369/13.33 |
| 2010/0219819 A1 * | 9/2010 | Kimura et al. | 324/244 |

FOREIGN PATENT DOCUMENTS

| | | | |
|---|---|---|---|
| JP | 3-263633 A | | 11/1991 |
| JP | 8-136556 A | | 5/1996 |
| JP | 9280810 | | 10/1997 |
| JP | 10-40676 | | 2/1998 |
| JP | 10-040676 | * | 2/1998 |
| JP | 10040676 A | * | 2/1998 |
| JP | 11-108610 | * | 4/1999 |
| JP | 11-120758 | | 4/1999 |
| JP | 2001189041 | | 7/2001 |
| JP | 2004134079 A | * | 4/2004 |
| KR | 10-0677805 | | 1/2007 |
| KR | 10-2007-0106887 | | 11/2007 |

OTHER PUBLICATIONS

Translation of JP 10040676, Feb. 1998.*

Chinese Office Action dated Jun. 24, 2005 and English Translation.

Myers, E.B., et al., "*Current-Induced Switching of Domains in Magnetic Multilayer Devices*", Science, Aug. 6, 1999, pp. 867-870, vol. 285, AAAS, Washington, DC, USA.

Official Action issued by the Japanese Patent Office on Dec. 6, 2006, in corresponding JP2003-353048; and English translation of abstract thereof.

Chinese Office Action dated Jun. 8, 2007 (with English Translation).

Myers, et al., "Thermally Activated Magnetic Reversal Induced by a Spin-Polarized Current", Cornell University, Physical Review Letters, Nov. 4, 2002, vol. 89, No. 19, pp. 196801-1-196801-4.

Katine, et al., "Current-Driven Magnetization Reversal and Spin-Wave Excitations in Co/Cu/Co Pillars", Physical Review Letters, Apr. 3, 2000, vol. 84, No. 14, pp. 3149-3152.

Wegrowe, et al., "Spin-polarized current induced magnetization switch: Is the modulus of the magnetic layer conserved? (invited)", Journal of Applied Physics, May 15, 2002, vol. 91, No. 10, pp. 6806-6811.

Albert, et al., "Spin-polarized current switching of a Co thin film nanomagnet", Applied Physics Letters, Dec. 4, 2000, vol. 77, No. 23, pp. 3809-3811.

Wegrowe, et al., "Exchanged torque and spin transfer between spin polarized current and ferromagnetic layers", Applied Physics Letters, May 20, 2002, vol. 80, No. 20, pp. 3775-3777.

Katine, et al., "Current-induced realignment of magnetic domains in nanostructured Cu/Co multilayer pillars", Applied Physics Letters, Jan. 17, 2000, vol. 76, No. 3, pp. 354-356.

Myers, et al., "Current-Induced Switching of Domains in Magnetic Multilayer Devices", www.sciencemag.org, Aug. 6, 1999, vol. 285, pp. 867-870.

J.C. Slonczewski, "Current-driven excitation of magnetic multilayers", Journal of Magnetism and Magnetic Materials 159 (1996), pp. L1-L7.

* cited by examiner

MAGNETIC MEDIUM USING SPIN-POLARIZED ELECTRONS AND APPARATUS AND METHOD OF RECORDING DATA ON THE MAGNETIC MEDIUM

BACKGROUND OF THE INVENTION

This application claims the priorities of Korean Patent Application Nos. 2002-62481 and 2003-56423, filed on Oct. 14, 2002, and Aug. 14, 2003, respectively, in the Korean Intellectual Property Office, the disclosure of which is incorporated herein in its entirety by reference.

1. Field of the Invention

The present invention relates to a magnetic medium and an apparatus and method of recording data on the magnetic medium, and more particularly, to a magnetic medium using spin-dependent electron scattering and an apparatus and method of recording data on the magnetic media.

2. Description of the Related Art

In conventional data storage devices, if a magnetic medium is used as a recording medium, data is stored on the magnetic recording medium by reversing the direction of magnetization caused by a magnetic field. As the recording density of conventional data storage devices increases, a bit, the smallest data recording unit, becomes smaller, and accordingly, a magnetic field for recording data must be reduced so as to be focused on a small area corresponding to the bit. However, ironically, with an increase in the size of the magnetic anisotropy of a magnetic layer, the intensity of the magnetic field needed to reverse the magnetization of the magnetic layer must be increased.

To overcome this technical problem of the conventional art, U.S. Pat. No. 6,304,481 discloses a method and apparatus for storing data using spin-polarized electrons.

FIG. 1 is a cross-sectional view of the data storage apparatus disclosed in the above U.S. Patent. Referring to FIG. 1, the disclosed data storage apparatus includes a control unit 1, a spin-polarized electron source 40 having a tip 2b, an extractor 4, collimators 6, 7, and 9, electrostatic lenses 10, 11, and 12, and insulating elements 5 and 8. The data storage apparatus also includes a blanking element 13, coarse and fine microdeflectors 14 and 15, respectively, an electron detector 16, a data storage layer 17, and a substrate 18.

The control unit 1 receives control signals and data from an external device (not shown) via ADDRESS IN, DATA IN, and DATA OUT terminals, and decodes the received control signals and data using necessary protocols. The control unit 1 develops control responses and data and returns them to the external device.

The electron source 40, including the tip 2b, provides spin-polarized electrons 3, and the tip 2b collects them. The extractor 4 extracts the spin-polarized electrons 3 from the tip 2b, and the collimators 6, 7, and 9 collimate the spin-polarized electrons 3 into a spin-polarized electron beam 19. The electrostatic lenses 10, 11, and 12 focus the spin-polarized electron beam 19, and the coarse and fine microdeflectors 14 and 15, respectively, direct the spin-polarized electron beam 19 toward a magnetic field generated within part of the data storage layer 17, where data is to be stored.

The data storage layer 17 includes a plurality of alignment areas 22 and an electrically conductive material 27 electrically insulated from the data storage layer 17 by an insulator 28.

The control unit 1 applies a potential $V_1$ to the electron source 40 and also applies potentials $V_2$-$V_5$ to the electron source 40 to obtain desired characteristics of the spin-polarized electrons 3 and the spin-polarized electron beam 19. Potentials $V_6$-$V_8$ are applied to the electrostatic lenses 10, 11, and 12, respectively, by the control unit 1 to create electrostatic fields through lens apertures. Potentials $V_{12}$-$V_{19}$ are applied to one end of a stigmator element 25 by the control unit 1. The control unit 1 applies a signal S19 to the electron source 40 to determine the direction of spin polarization of the spin-polarization electrons 3, and also applies signals $S_2$-$S_9$ and $S_{10}$-$S_{17}$ to the coarse and fine microdeflectors 14 and 15, respectively, to direct the spin-polarized electron beam 19 toward the data storage layer 17. Also, the control unit 1 applies a signal $S_1$ to the blanking element 13 and alternately detects signals $S_{18}$ and $S_{20}$ to read data therefrom.

The disclosed data storage apparatus have to minutely adjust potentials to focus an electron beam onto a specific data area. The minute adjustment of potentials is not easy, and accurate output of signals where data has been recorded is not easy either, which makes data reproduction difficult. Also, due to the use of conventional magnetic media, there is a limit to increasing the data recording density of the magnetic media, and the disclosed data storage apparatus has a complicated structure.

SUMMARY OF THE INVENTION

The present invention provides a magnetic medium of a high density and a large capacity on which data is recorded using received electrons having unidirectional spins, and an apparatus and method of recording data at a high speed using a probe which injects the electrons into the magnetic medium.

According to an aspect of the present invention, there is provided a data recording apparatus that includes a light source and a probe. The light source radiates circularly polarized light. The probe injects electrons spin-polarized by the circularly polarized light into a magnetic medium and changes the direction of the magnetization of the magnetic medium to record data on the magnetic medium.

According to this aspect of the present invention, the light source is a laser.

According to this aspect of the present invention, there is also provided a data recording apparatus including a probe having a tip capped with a magnetic film which spin-polarizes electrons, the probe injecting the electrons into a magnetic medium and changing the direction of the magnetization of a magnetic recording layer of the magnetic medium to record data on the magnetic medium.

According to this aspect of the present invention, there is also provided a data recording apparatus that includes a magnetic medium and a probe. The magnetic medium includes a polarization layer for spin-polarizing electrons and a recording layer. The direction of magnetization of the recording layer changes according to the direction of the spin-polarization of the electrons. The probe records data on the magnetic medium.

According to another aspect of the present invention, there is provided a magnetic medium that includes a polarization layer that spin-polarizes electrons, and a magnetic recording layer in which the direction of magnetization varies depending on the direction of the spin-polarization of the electrons.

According to still another aspect of the present invention, there is provided a data recording method including spin-polarizing electrons injected into a magnetic medium by a probe, and recording data on the magnetic medium by changing the direction of magnetization of a recording layer of the magnetic medium according to the direction of spin polarization of the electrons.

According to the still another aspect of the present invention, the electrons are spin-polarized by circularly polarized light, and the circularly polarized light is a laser.

According to the still another aspect of the present invention, the probe has a tip capped with a magnetic film which spin-polarizes electrons.

According to the still another aspect of the present invention, there is provided a data recording method including preparing for a magnetic medium having a recording layer and a polarization layer and a probe that records data while moving over the magnetic medium, and spin-polarizing electrons using the polarization layer and recording data on the magnetic medium by changing the direction of magnetization of the magnetic recording layer according to the direction of spin polarization of the electrons.

According to the still another aspect of the present invention, the electrons are injected via the probe or the magnetic medium.

According to the still another aspect of the present invention, each of the magnetic recording layer and the polarization layer has one of longitudinal magnetic anisotropy and perpendicular magnetic anisotropy.

According to the still another aspect of the present invention, the magnetic recording layer and the polarization layer are continuous thin films, where bits are arranged consecutively, or entirely—or partially-patterned thin films.

According to the still another aspect of the present invention, the magnetic recording layer and the polarization layer are thin films whose bits are formed of nano particles.

According to the still another aspect of the present invention, an oxide layer through which electrons tunnel is further formed on an interface between the magnetic recording layer and the polarization layer, on the polarization layer, or on the magnetic recording layer.

According to the still another aspect of the present invention, a metal layer is further formed on an interface between the magnetic recording layer and the polarization layer.

As described above, a magnetic medium according to the present invention has a magnetic recording layer in which the direction of magnetization is changed by the spin momentum and spin-spin torque of spin-polarized electrons. In a data recording apparatus and method according to the present invention, electrons having unidirectional spins are injected into the magnetic medium, and accordingly, fast data recording can be achieved because of the simple structure of the data recording apparatus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
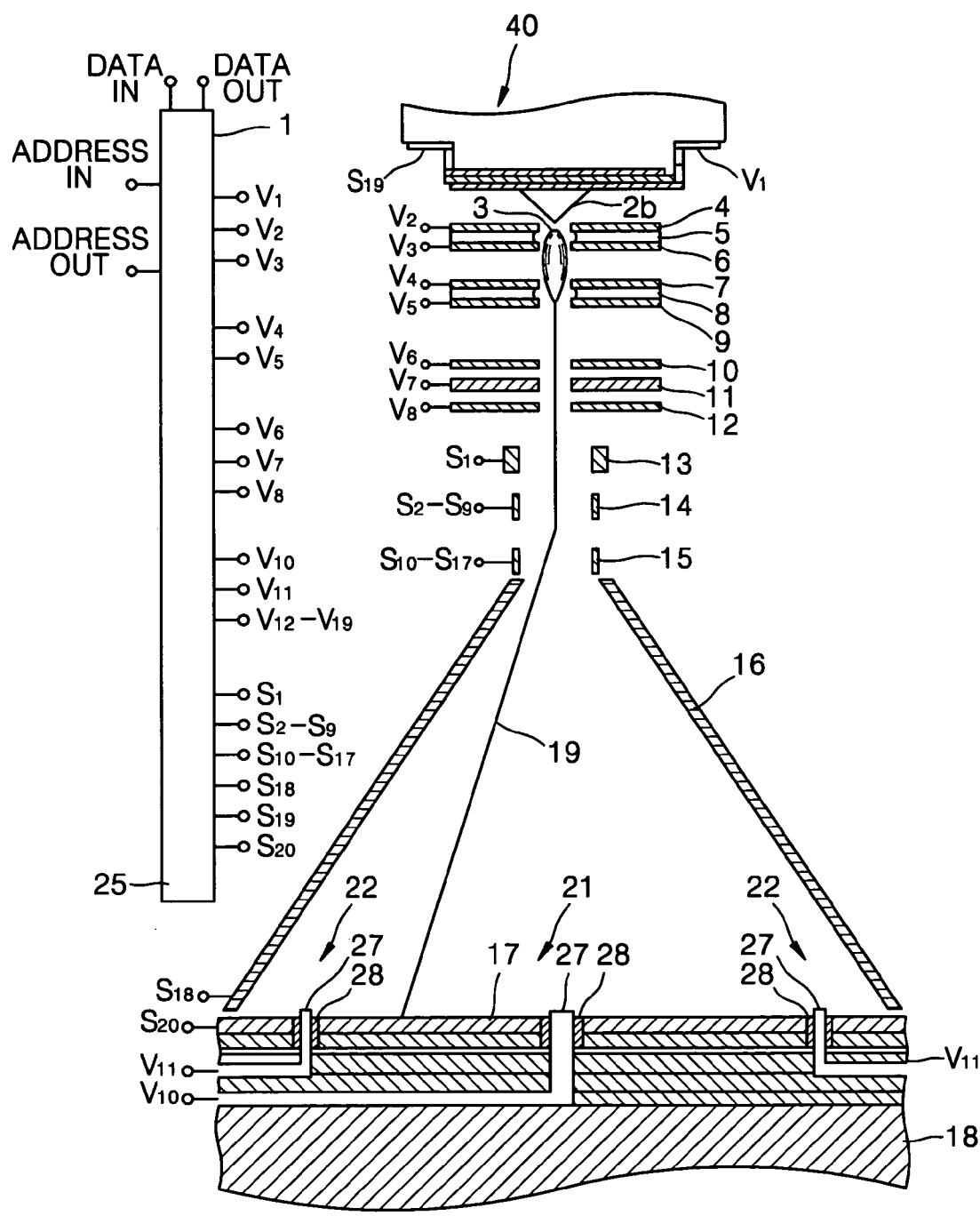
FIG. 1 is a cross-sectional view of a data storage apparatus disclosed in U.S. Pat. No. 6,304,481.
Figure 2:
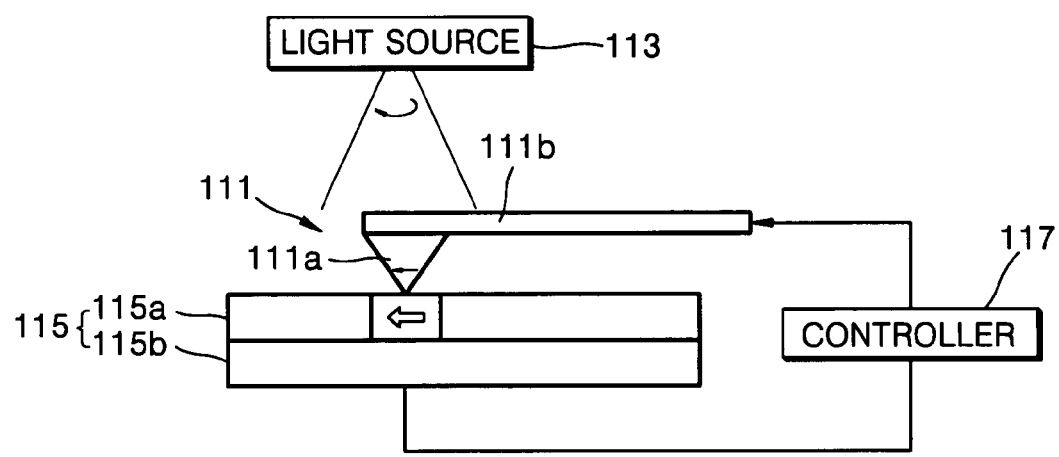
FIG. 2 is a schematic diagram of a data recording apparatus according to a first embodiment of the present invention.

Referring to FIG. 2, a data recording apparatus according to a first embodiment of the present invention includes a magnetic medium 115, a probe 111, and a controller 117. The magnetic medium 115 is comprised of a substrate 115b and a magnetic recording layer 115a formed on the upper surface of the substrate 115b. The probe 111 is comprised of a tip 111a and a cantilever 111b at one end of which the tip 11a is installed. The controller 117 is electrically connected to both the probe 111 and the magnetic medium 115 and applies current to the probe 111.

To record data on the magnetic recording layer 115a of the magnetic medium 115, the probe 111 comes in contact with the magnetic recording layer 115a, and the controller 117 applies a voltage to the tip 111a. At this time, electrons excited in the tip 111a are spin-polarized in one direction by left-handed or right-handed circularly polarized light radiated from a light source 113 located over the probe 111. The spin-polarized electrons are emitted from the tip 111a and injected into the magnetic recording layer 115a. The spin momentum or spin-spin torque of each of the electrons is transmitted to bits of the magnetic recording layer 115a to change the direction of magnetization of the bits.

The tip 111a may be a conventional semiconductor tip or a conductive metal tip. The cantilever 111b changes the location of the tip 11a depending on the type of signals received from the controller 117. The controller 117 may consist of general circuitry which controls the position of the cantilever 111b and adjusts the amount of current.

The magnetic recording layer 115a may be formed of a ferromagnetic material having longitudinal or perpendicular magnetization anisotropy or may be a continuous thin film or a thin film having bits formed of nano particles. The magnetic recording layer 115a may be entirely or partially patterned. A magnetic layer having a unidirectional magnetization may be further formed at an interface between the substrate 115b and the magnetic recording layer 115a.

The light source 113 may use a laser and further includes a polarizer to produce circularly polarized light. Current is spin-polarized according to the direction of circularly polarized light, and then the direction of the magnetization of the magnetic recording layer 115a varies depending on the direction of the spin polarization.

Figure 3:
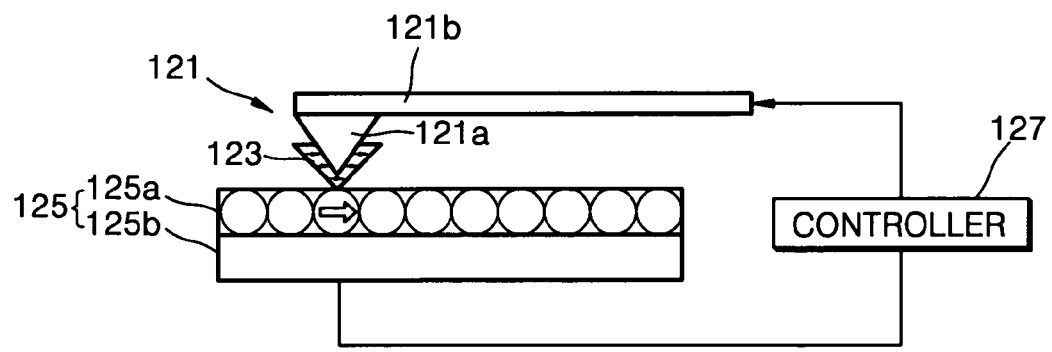
FIG. 3 is a schematic diagram of a data recording apparatus according to a second embodiment of the present invention.

FIG. 3 is a schematic diagram of a data recording apparatus and method according to a second embodiment of the present invention. Referring to FIG. 3, the data recording apparatus includes a probe 121, a magnetic medium 125, and a controller 127. The probe 121 has a tip 121a capped with a magnetic film 123 having a unidirectional magnetization. The magnetic medium 125 includes a magnetic recording layer 125a. While electrons spin-polarized in one direction by the magnetic film 123 are being introduced into the magnetic medium 125 from the probe 121, the direction of magnetization of a bit of the magnetic recording layer 125a in contact with the probe 121 is aligned with the direction of the spin polarization of electrons. The controller 127 applies current to the probe 121 so that electrons are introduced into the probe 121. In other words, the spin-polarized electrons change the direction of magnetization of the magnetic recording layer 125a using their spin momentum or spin-spin torque transmitted to the magnetic recording layer 125a. The magnetic medium 125 may be any general magnetic medium or any magnetic medium having a magnetic recording layer. The magnetic recording layer 125a may have bits formed of nano particles.

Figure 4A:
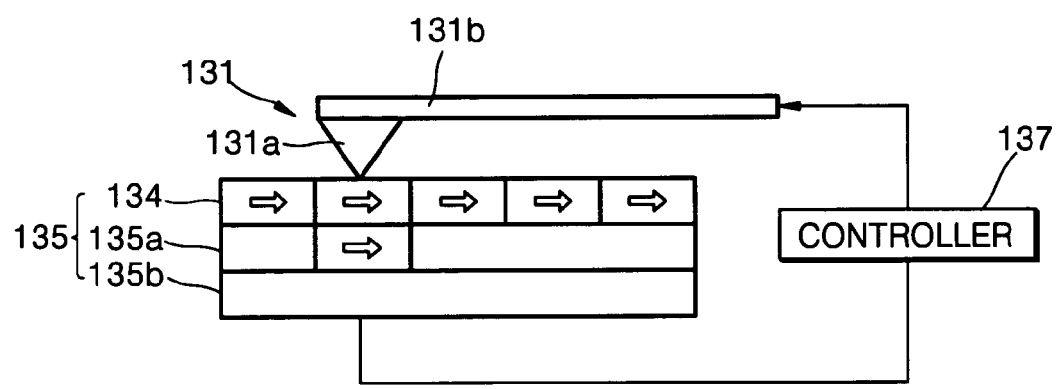
FIG. 4A is a schematic diagram showing a magnetic medium according to a first embodiment of the present invention and a data recording apparatus according to a third embodiment of the present invention which records data on the magnetic medium.

FIG. 4A shows a magnetic medium 135 according to a first embodiment of the present invention and a data recording apparatus according to a third embodiment of the present invention including the magnetic medium 135. Referring to FIG. 4A, the magnetic medium 135 according to the first embodiment of the present invention includes a substrate 135b, a magnetic recording layer 135a formed on the upper surface of the substrate 135b, and a polarization layer 134 formed on the upper surface of the magnetic recording layer 135a. The polarization layer 134, which is a magnetic layer having a unidirectional magnetization, spin-polarizes electrons received from the probe 131 in one direction and transmits the spin-polarized current to the magnetic recording layer 135a. The magnetic recording layer 135a may be a continuous thin film, where bits are consecutively aligned, or an entirely- or partially-patterned thin film. The bits may be formed of nano particles. The magnetization of bits changes according to the direction of spin-polarization of the electrons spin-polarized by the polarization layer 134, whereby data is recorded in the magnetic recording layer 135a.

The data recording apparatus according to the third embodiment of the present invention records data on the magnetic medium 135. To achieve this, in addition to the magnetic medium 135, the data recording apparatus includes the probe 131 and a controller 137. The probe 131 includes a general conductive tip 131a and a cantilever 131b, to one end of which the tip 131a is attached. The controller 117 applies current to the probe 131 and moves the cantilever 131b in an X-axis or Y-axis direction over the polarization layer 134 so as to record data in the individual bits of the magnetic recording layer 135a. The tip 131a, the magnetic medium 135, and the controller 137 constitute a circuit, and electrons are injected into the magnetic medium 135 via the tip 131a. The received electrons are spin-polarized by the polarization layer 134 of the magnetic medium 135. The direction of magnetization of bits of the magnetic recording layer 135a changes according to the direction of the spin-polarization of the electrons, whereby data is recorded in the magnetic recording layer 135a.

If the magnetization directions of the polarization layer 134 and the magnetic recording layer 135a are different, electrons are injected into the magnetic medium 135 via the tip 131a. The injected electrons are spin-polarized in the direction of polarization of the polarization layer 134 while passing through the polarization layer 134. The magnetization of a bit of the magnetic recording layer 135a changes according to the direction of spin-polarization of the injected electrons, whereby data is recorded. If the magnetization directions of the polarization layer 134 and the magnetic recording layer 135a are identical, electrons are injected into the magnetic medium 135 via a substrate 135b. Among the injected electrons, electrons in the same direction as the spin-polarization of the polarization layer 134 penetrate the magnetic recording layer 135a and the polarization layer 134. On the other hand, electrons having a different direction from the spin-polarization of the polarization layer 134 return from the polarization layer 134 to the magnetic recording layer 135a, and the direction of magnetization of bits of the magnetic recording layer 135a changes according to the direction of spin-polarization of the returning electrons to record data.

Figure 4B:
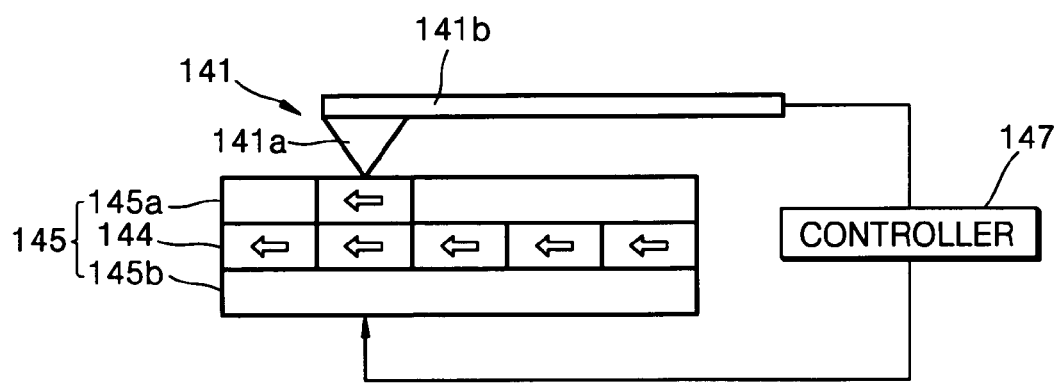
FIG. 4B is a schematic diagram showing a magnetic medium according to a second embodiment of the present invention and a data recording apparatus according to a fourth embodiment of the present invention which records data on the magnetic medium.

FIG. 4B shows a magnetic medium 145 according to a second embodiment of the present invention and another data recording apparatus according to a fourth embodiment of the present invention, which records data to the magnetic medium 145. In contrast with the magnetic medium 135 of FIG. 4A, the magnetic medium 145 of FIG. 4B has a structure in which the position of a polarization layer and a magnetic recording layer is reversed, that is, a magnetic recording layer 145a is formed on a polarization layer 144. In this reversed structure, electrons are injected in an opposite way to the injection of electrons into the recording medium 135. A conductive probe and a control circuit that are similar to the probe 131 and the controller 137 of FIG. 4 may be used as a probe 141, which injects electrons into the recording medium 145, and a controller 147, which applies current to the probe 141. Reference numeral 141a denotes a tip, and reference numeral 141b denotes a cantilever for supporting the tip 141a.

If the magnetization directions of the polarization layer 144 and the magnetic recording layer 145a are identical, electrons are injected into the magnetic medium 145 via the tip 141a. Among the injected electrons, electrons in the same direction as the spin-polarization of the polarization layer 144 penetrate the polarization layer 144 and the magnetic recording layer 145a. On the other hand, electrons having a different direction from the spin-polarization of the polarization layer 144 return from the polarization layer 144 to the magnetic recording layer 145a, and the direction of magnetization of bits of the magnetic recording layer 145a changes according to the direction of spin-polarization of the returning electrons to record data. If the magnetization directions of the polarization layer 144 and the magnetic recording layer 145a are different, electrons are injected into the magnetic medium 145 via a substrate 145b. The electrons transmitted by the substrate 145b are spin-polarized while passing through the polarization layer 144. The direction of magnetization of a bit of the magnetic recording layer 145a in contact with the probe 141 is aligned with the direction of spin-polarization of the electrons.

The data recording apparatus according to the third and fourth embodiments of the present invention include the conductive probes 131 and 141, respectively, to reproduce data from the magnetic media 135 and 145 according to the first and second embodiments of the present invention. Also, the data recording apparatus inject electrons into the magnetic media 135 and 145 in different directions according to the different arrangements of the polarization layers 134 and 144 and the magnetic recording layers 135a and 145a to record data on the magnetic media 135 and 145.

Figure 5A:
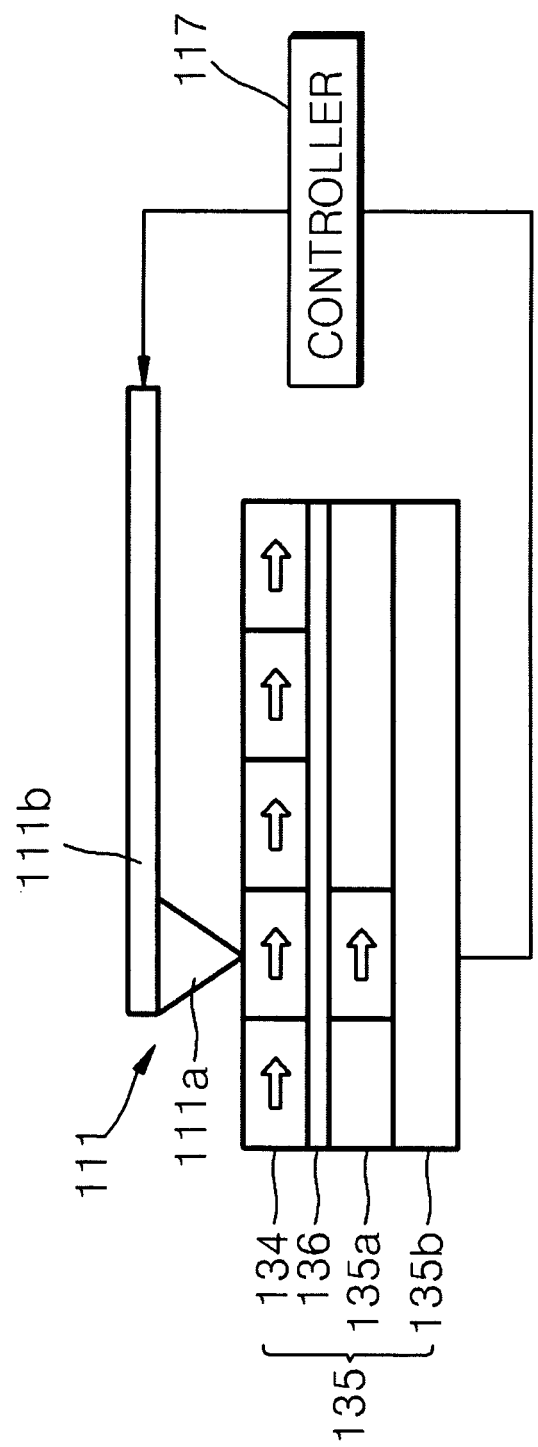
FIG. 5A is a schematic diagram showing an embodiment similar to that shown in FIG. 4A, but further including an oxide layer.

FIG. 5A is a schematic diagram showing an embodiment similar to that shown in FIG. 4A, but further including an oxide layer 136, through which electrons tunnel, on an interface between the magnetic recording layer 135a and the polarization layer 134.

Figure 5B:
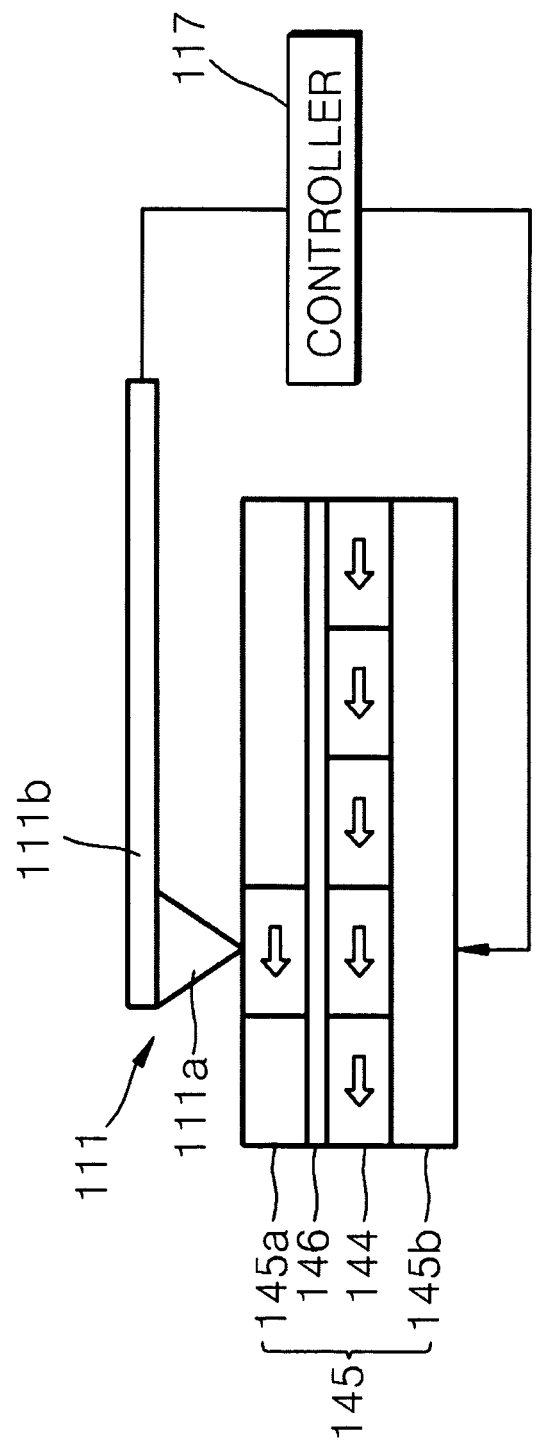
FIG. 5B is a schematic diagram showing an embodiment similar to that shown in FIG. 4B, but further including an oxide layer.

FIG. 5B is a schematic diagram showing an embodiment similar to that shown in FIG. 4B, but further including an oxide layer 146, through which electrons tunnel, on an interface between the magnetic recording layer 145a and the polarization layer 144.

In the present invention, a light source, a probe, and a polarization layer are included to spin-polarize electrons in one direction, and the direction of magnetization of a magnetic recording layer is aligned with the direction of the spin polarization of current. Thus, fast data recording can be achieved.

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, in a magnetic medium including a polarization layer according to the present invention and an apparatus and method of recording data on the magnetic medium, fast data recording can be achieved by changing the direction of magnetization of bits of a magnetic recording layer according to the direction of the spin polarization of electrons.

What is claimed is:

1. A data recording apparatus comprising:
   a laser that radiates circularly polarized light; and
   a movable probe that injects electrons into a magnetic medium when contacting the magnetic medium to change the direction of magnetization of the magnetic medium to record data on the magnetic medium, the injected electrons being spin-polarized by the circularly polarized light.

2. A data recording apparatus comprising:
   a probe having:
      a tip formed of a semiconductor or conductive metal;
      a separate magnetic film capping the outer surface of the tip, the magnetic film spin-polarizing electrons from the tip;
      wherein the probe injects the electrons into a magnetic medium and changes the direction of the magnetization of a magnetic recording layer of the magnetic medium to record data on the magnetic medium.

3. A data recording apparatus comprising:
   a magnetic medium that includes a polarization layer for spin-polarizing electrons and a recording layer, the direction of magnetization of the recording layer changing according to the direction of the spin-polarization of the electrons; and
   a movable probe that records data on the magnetic medium by injecting electrons spin-polarized by the polarization layer into the magnetic medium when contacting the magnetic medium, and wherein at least some of the injected spin-polarized electrons change the direction of magnetization of the magnetic medium.

4. The data recording apparatus of claim 3, wherein the polarization layer has a first spin-polarization direction and wherein electrons with the same first spin-polarization direction are injected into magnetic medium and electrons with a different second spin-polarization direction are returned to the recording layer.

5. The data recording apparatus of claim 2, wherein the magnetic film has a unidirectional magnetization.

6. The data recording apparatus of claim 2, wherein the spin-polarized electrons change the direction of magnetization of the magnetic recording layer using their spin-momentum or spin-spin torque transmitted to magnetic recording layer.

7. The data recording apparatus of claim 3, wherein the direction of magnetization of a bit of the magnetic recording layer in contact with the probe is aligned with the direction of the spin polarization of electrons.

8. The data recording apparatus of claim 3, wherein the magnetic recording layer and the polarization layer are entirely—or partially-patterned thin films.

9. The data recording apparatus of claim 3, wherein the magnetic recording layer and the polarization layer are thin films whose bits are formed of nano particles.

10. The data recording apparatus of claim 3, further comprising an oxide layer through which electrons tunnel, the oxide layer formed on an interface between the magnetic recording layer and the polarization layer.

11. The data recording apparatus of claim 3, wherein the magnetic film has a unidirectional magnetization.

12. The data recording apparatus of claim 3, wherein the polarization layer has a unidirectional magnetization.

13. The data recording apparatus of claim 3, wherein the magnetization of the magnetic recording layer is in the same direction as the magnetization of the polarization layer.

14. A magnetic medium formed on a substrate, the magnetic medium comprising:
   a polarization layer that spin-polarizes electrons; and
   a magnetic recording layer in which the direction of magnetization varies depending on the direction of the spin-polarization of the electrons, wherein
      (a) if the polarization layer, the magnetic recording layer and a tip of a probe arranged at one side of the magnetic medium have a first structure, then the electrons are injected into the magnetic recording layer via the substrate when the magnetization directions of the polarization layer and the magnetic recording layer are the same, but the electrons are injected into the magnetic recording layer via the tip of the probe when the magnetization directions of the polarization layer and the magnetic recording layer are different, or
      (b) if the polarization layer, the magnetic recording layer and the tip of the probe have a second structure, then the electrons are injected into the magnetic recording layer via the tip when the magnetization directions of the polarization layer are the same, but the electrons are injected into the magnetic recording layer via the substrate when the magnetization directions of the polarization layer and the magnetic recording layer are different, wherein
         the first structure and the second structure are different.

15. The magnetic medium of claim 14, wherein the magnetic recording layer has a unidirectional magnetization.

16. The magnetic medium of claim 14, wherein the magnetic recording layer and the polarization layer are continuous thin films.

17. The magnetic medium of claim 14, wherein the magnetic recording layer and the polarization layer are entirely- or partially-patterned thin films.

18. The magnetic medium of claim 14, wherein the magnetic recording layer and the polarization layer are thin films whose bits are formed of nano particles.

19. The magnetic medium of claim 14, further comprising an oxide layer through which electrons tunnel, the oxide layer formed on an interface between the magnetic recording layer and the polarization layer.

20. The magnetic medium of claim 14, further comprising an oxide layer through which electrons tunnel, the oxide layer formed on the polarization layer.

21. The magnetic medium of claim 14, wherein the polarization layer has a unidirectional magnetization.

22. The magnetic medium of claim 14, wherein the polarization of the magnetic recording layer is either in the same direction as the polarization layer or the magnetic recording layer is not polarized.

23. A data recording method comprising:
   spin-polarizing electrons injected into a magnetic medium by applying a voltage to the magnetic medium via a movable probe when the movable probe contacts the magnetic medium; and recording data on the magnetic medium by changing the direction of magnetization of a recording layer of the magnetic medium via a polarization layer according to the direction of spin polarization of the electrons, wherein the polarization layer has a unidirectional magnetization, and wherein the polarization of the magnetic recording layer is in the same direction as the polarization of the polarization layer or magnetic recording layer is not polarized.

24. The data recording method of claim 23, wherein the electrons are spin-polarized by circularly polarized light.

25. The data recording method of claim 24, wherein the circularly polarized light is a laser.

26. The data recording method of claim 23, wherein the probe has a tip capped with a magnetic film which spin-polarizes electrons.

27. A data recording method comprising:

preparing for a magnetic medium having a recording layer and a polarization layer and a probe that records data while moving over the magnetic medium; and spin-polarizing electrons using the polarization layer and recording data on the magnetic medium, wherein the spin polarizing includes, (a) if the polarization layer, the magnetic recording layer and a tip of a probe arranged at one side of the magnetic medium have a first structure, injecting electrons into the magnetic recording layer via a tip of a probe arranged at one side of the magnetic medium if the magnetization directions of the polarization layer and the magnetic recording medium are different, but injecting electrons into the magnetic recording layer via a substrate if the magnetization directions of the polarization layer and the magnetic recording medium are the same, or (b) if the polarization layer, the magnetic recording layer and the tip of the probe have a second structure, injecting electrons into the magnetic recording layer via the substrate if the magnetization directions of the polarization layer and the magnetic recording medium are different, but injecting electrons into the magnetic recording layer via the tip if the magnetization directions of the polarization layer and the magnetic recording medium are the same, wherein the first structure and the second structure are different.

28. The data recording method of claim 27, wherein each of the magnetic recording layer and the polarization layer has one of longitudinal magnetic anisotropy and perpendicular magnetic anisotropy.

29. The data recording method of claim 27, wherein the magnetic recording layer and the polarization layer are continuous thin films.

30. The data recording method of claim 27, wherein the magnetic recording layer and the polarization layer are entirely- or partially-patterned thin films.

31. The data recording method of claim 27, wherein the magnetic recording layer and the polarization layer are thin films whose bits are formed of nano particles.

32. The data recording method of claim 27, wherein the magnetic medium in the preparing for a magnetic medium step further comprises an oxide layer through which electrons tunnel, the oxide layer formed on an interface between the magnetic recording layer and the polarization layer.

33. The data recording method of claim 27, wherein the polarization layer has a unidirectional magnetization.

34. The data recording method of claim 27 wherein the magnetic recording layer has a unidirectional magnetization.

35. The data recording method of claim 27, wherein the polarization of the magnetic recording layer is either in the same direction as the polarization layer or the magnetic recording layer is not polarized.

* * * * *